United States Patent [19]

Satoh et al.

[11] Patent Number: 5,214,626
[45] Date of Patent: May 25, 1993

[54] INFORMATION RECORDING/REPRODUCING APPARATUS FOR WRITING ON AND READING FROM A REWRITABLE OPTICAL DISK HAVE TRACKS DIVIDED INTO A PLURALITY OF SECTORS

[75] Inventors: Isac Satoh, Neyagawa; Yoshihisa Fukushima, Osaka; Yuji Takagi, Hirakata; Yasushi Azumatani, Neyagawa; Hiroshi Hamasaka, Nishinomiya, all of Japan

[73] Assignee: Matsushita Electric Industrial Co., Ltd., Osaka, Japan

[21] Appl. No.: 753,886

[22] Filed: Sep. 3, 1991

[30] Foreign Application Priority Data

Sep. 3, 1990 [JP] Japan .................................. 2-233506

[51] Int. Cl.$^5$ ........................ G11B 7/00; G11B 21/10
[52] U.S. Cl. .................................... 369/32; 369/44.28
[58] Field of Search ............... 369/32, 44.28, 124, 369/41, 47, 58, 54, 56, 44.34; 360/78.01, 78.05, 78.14, 78.04, 78.06

[56] References Cited

U.S. PATENT DOCUMENTS

| | | | |
|---|---|---|---|
| 4,736,352 | 4/1988 | Satoh et al. | 369/32 |
| 4,860,272 | 8/1989 | Nishikawa et al. | 369/44.28 |
| 4,926,405 | 5/1990 | Hangai et al. | 369/32 |

FOREIGN PATENT DOCUMENTS

57-150144 9/1982 Japan .

Primary Examiner—Aristotelis Psitos
Assistant Examiner—Thang V. Tran
Attorney, Agent, or Firm—Wenderoth, Lind & Ponack

[57] ABSTRACT

An information recording/reproducing apparatus is suitable for writing on and reading from a rewritable optical disk signals having a time-based continuity attribute such as video signals and audio signals. The optical disk has a plurality of tracks each divided into sectors. The apparatus has a RAM for storing data externally supplied, and first and second address counters for generating addresses for writing into and reading from the RAM, respectively. The apparatus also has a track-jump detector circuit for detecting the occurrence of a track jump of an optical head while the head is writing on the disk. When a track jump is detected, a laser driving circuit stops actuating the head such that the writing operation is halted, and a track-jump address latch circuit stores an address of a track-jump occurring sector. Based on the address stored in the track-jump address latch circuit and a track address where the head is actually is, the head is returned to the sector where the track jump occurred. Then, under control of a CPU, the second address counter again generates addresses at which the RAM stores data which should have been written on the track-jump occurring sector from its leading position. Thus, even if a track jump occurs, information having a time-based continuity attribute is recorded without any data loss.

6 Claims, 4 Drawing Sheets

INFORMATION RECORDING/REPRODUCING APPARATUS FOR WRITING ON AND READING FROM A REWRITABLE OPTICAL DISK HAVE TRACKS DIVIDED INTO A PLURALITY OF SECTORS

BACKGROUND OF THE INVENTION

1. Field of the Invention

The present invention relates to an information recording/reproducing apparatus suitable for recording and reading signals having a time-based continuity attribute, such as audio signals and video signals.

2. Description of the Prior Art

Information recording/reproducing apparatus using an optical disk as a recording medium can offer a high recording density more than ten times as much as that of magnetic disks by virtue of high convergency of laser beams and narrowed track pitches. With the recent progress in the field of optical disk medium techniques such as magneto-optical disks and phase-change rewritable media, rewritable media like magnetic media are being put into practical use.

With this technical progress as background, it is now on trial to add recording function to compact disks (CDs) and video disks (VDs), which have conventionally been used exclusively for reproduction or reading.

As is common knowledge, a great feature of the optical disks is that information can be recorded into and read out of the optical disks in a non-contact manner through the use of a laser beam from the optical head.

More specifically, in the conventional information recording/reproducing apparatus incorporating an optical disk, a laser beam emitted from the optical head which is approximately 1 mm apart from the surface of the optical disk is applied to tracks formed at a pitch of approximate 1.6 $\mu$m through a transparent substrate material having a thickness of 1.2 mm, and the laser beam is modulated at a recording power level by a recording signal as focusing and tracking of the laser beam is performed, so that data is recorded. Reproduction of data, on the other hand, is carried out by applying a subdued laser beam to the optical disk and demodulating a signal obtained from reflection light of the laser beam.

However, as described above, the optical head is in non-contact with the optical disk, the track pitch is as narrow as 1.6 $\mu$m or so, and the laser beam has no inertia. As a result, the conventional information recording/reproducing apparatus are liable to cause track jumps of the optical head due to external shocks or vibrations, thus having difficulty in recording audio signals and video signals having a time-based continuity attribute.

Another apparatus is known which is adapted to detect a track jump of a head and halt a recording operation (Japanese Laid-open Patent Application No. 57-150144 issued in 1982).

This apparatus, however, merely halts a recording operation upon detection of a track jump, and does not perform further data recording. Therefore, this apparatus is not suitable for recording audio signals and video signals having a time-based continuity attribute.

SUMMARY OF THE INVENTION

The object of the present invention is therefore to provide an information recording/reproducing apparatus which allows signals having a time-based continuity attribute to be recorded and read out without data loss even if track jumps take place.

In order to achieve the aforementioned object, the present invention provides an information recording/reproducing apparatus for writing to and reading from a rewritable optical disk having tracks divided into a plurality of sectors, said sectors each being a unit of data writing and reading, which apparatus comprises an optical head which follows a target track while emitting a laser beam such that the laser beam focuses on said target track, thereby writing on and reading from said optical disk; a track search means for searching said target track and moving said optical head to said target track; a recording and reproducing means for actuating said optical head such that said optical head writes on and reads from said optical disk; a track address regeneration means for reading out an address of a track being followed by said optical head; a track-jump detection the means for detecting occurrence of a track jump while said optical head is writing data on said optical disk; a track-jump address storage means for, upon detection of a track jump by said track detection means, storing an address of a jump-track-jump occurring sector where the track jump has occurred; a recording hale means for, upon detection of a track jump by said track-jump detection means, halting said recording/reproducing means so as to halt data writing by said optical head; a buffer means for temporarily storing data supplied from information source; a first data address generation means for generating addresses for writing into said buffer means; a second data address generation means for generating addresses for reading from said buffer means; and a control means for controlling said second data address generation means, based on said address of said jump-track occurring sector stored in said track-jump address storage means, to allow said recording/reproducing means to actuate said optical head to write data stored in said buffer means on said track-jump occurring sector and the following consecutive sectors.

With the above-described arrangement, the information recording/reproducing apparatus of the present invention operates as follows. When the track-jump detection means detects a track jump, the recording halt means immediately halts the writing or recording operation of the optical head. In this state, the track search means searches the track stored in the track-jump address storage means, and the second address generation means generates under control of the control means an address corresponding to the track-jump occurring sector address. Consequently, data read from the buffer means are written by the recording/reproducing means through the optical head on the track-jump occurring sector and the following consecutive sectors. Accordingly, the apparatus of the present invention can record information having a time-based continuity attribute without data loss even if a track jump of the optical head occurs during a record operation.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4(a)-(e) is a signal timing chart for data recording operation of the apparatus of FIG. 1.

DETAILED DESCRIPTION OF THE PREFERRED EMBODIMENTS

The information recording/reproducing apparatus of an embodiment of the present invention is described below with reference to the accompanying drawings.

Figure 1:
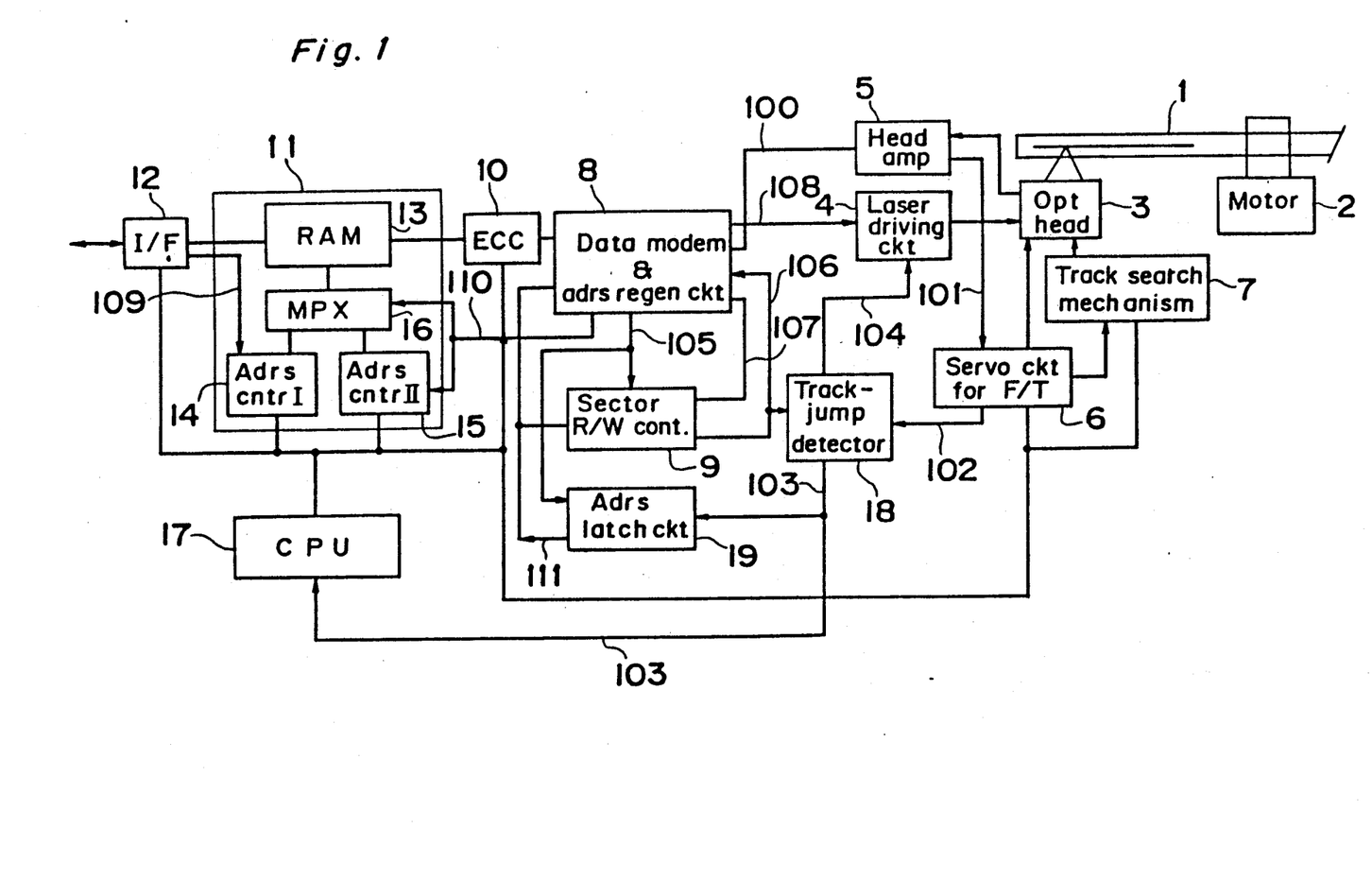
FIG. 1 is a block diagram of the information recording/reproducing apparatus of an embodiment of the present invention.

Referring now to FIG. 1, reference numeral 1 denotes an optical disk for recording information; reference numeral 2 denotes a motor for rotating the optical disk 1; reference numeral 3 denotes an optical head for writing a signal by converging a laser beam at the optical disk and further for reading the recorded information by reflection light of the converged laser beam; reference numeral 4 denotes a laser driving circuit for modulating laser emitted from the optical head 3; reference numeral 5 denotes a head amplifier circuit for detecting a reproduction signal 100 and a servo-error signal 101; reference numeral 6 denotes a servo circuit for performing a focusing and tracking of a laser beam emitted from the optical head 3 to on the tracks of the optical disk 1; reference numeral 7 denotes a track search mechanism 5 composed of a linear motor for allowing the optical head 3 to access a specified track; reference numeral 8 denotes a data modulating-/demodulating and address regenerating circuit for modulating and demodulating data and for regenerating addresses of sectors pre-formatted in the optical disk 1; reference numeral 9 denotes a sector recording/reproducing control circuit for, based on a comparison result between a target sector address set by a CPU 17 and a regenerative address signal 105, generating a gate signal that activates the recording and reproduction of data into a sector; reference numeral 10 denotes an error correction circuit (ECC) for encoding and decoding an error correction code and correcting an error.

Reference numeral 11 denotes a dual port memory for storing data to be recorded and data read out. The dual port memory 11 has a semiconductor random access memory (RAM) 13 for temporarily storing data to be written and read out, a memory address counter I 14 for generating in response to clock 109 a memory address at which data is written to into or read from the RAM 13 via the interface circuit 12, a memory address counter II for generating in response to clock 110 a memory address at which data is read from the RAM 13 to the data modulating/demodulating and address regenerating circuit 8 and the ECC 10 or at which data from the data modulating/demodulating and address regenerating circuit and the ECC is written into the RAM 13, and a multiplexer circuit 16 for selecting either of the memory addresses of the memory address counters I and II 14 and 15 to supply it as a memory address for the RAM 13.

Reference numeral 12 denotes a system interface circuit including SCSI (Small Computer System Interface) that connects a host system and an optical disk drive; reference numeral 17 denotes a CPU for performing system control over the entire drive unit; reference numeral 18 denotes a track-jump detector circuit for detecting any occurrence of a track jump of a laser beam of the optical head 3 by monitoring whether or not a tracking error signal 102 exceeds a threshold voltage $V_{th}$ while the tracking servo is in an ON state, so that the circuit outputs a track-jump signal 103 and a recording halt signal 104 for halting data recording of the laser driving circuit 4.

Figure 2:
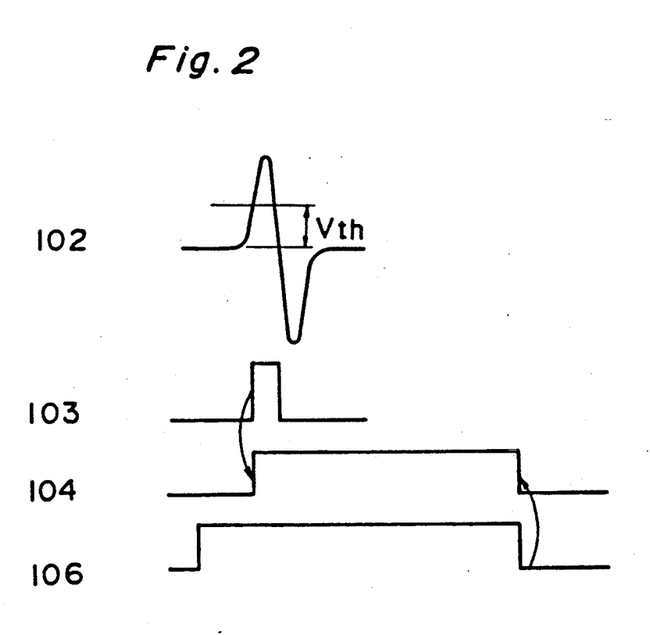
FIG. 2 illustrates waveforms of some of signals used in the apparatus of FIG. 1.

Examples of signal waveforms of the tracking error signal 102, track-jump signal 103, and recording halt signal 104 are shown in FIG. 2.

Further in FIG. 1, reference numeral 19 denotes an address latch circuit for latching a regenerative address signal 105 from the data modulating/demodulating and address regenerating circuit 8 in response to the track-jump signal 103 and then outputting a track-jump occurring address 111 to the CPU 17.

Reference numeral 106 denotes a write gate signal, which is generated by the sector read/write control circuit 9 to instruct the start of data recording; reference numeral 107 denotes a read gate signal, which is also generated by the sector read/write control circuit 9, for instructing the start of data reading; and reference numeral 108 denotes a data modulating signal from the data modulating/demodulating and address regenerating circuit 8.

Figure 3:
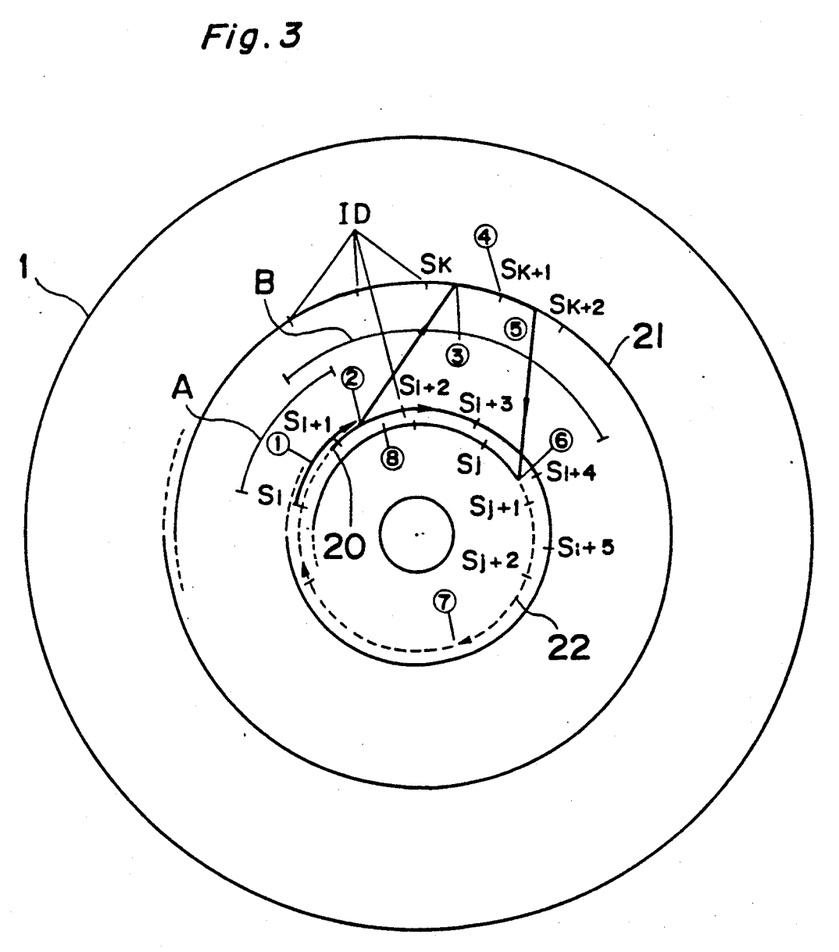
FIG. 3 is an explanatory diagram showing a trail of data recording on an optical disk in the embodiment of FIG. 1.

FIG. 3 shows an example of a trail of data recording on the optical disk in the embodiment of FIG. 1. Referring to this figure, the optical disk 1 is composed of sectors $S_i$, $S_{i+1}$, $S_{i+2}$, ..., $S_j$, $S_{j+1}$, ..., $S_k$, $S_{k+1}$, ..., which are MCAV (Modified Constant Angular Velocity) formatted to a constant length of data writing unit. A sector $S_x$ ($x=i, i+1, i+2, ..., j, j+1, j+2, ..., k, k+1, k+2,...$) has at its leading place an ID portion at which address information is recorded. Portions following the ID portion in each sector are used for writing data.

Now assume that data recording is started at the sector $S_i$ of a track 20 (①), a track jump has occurred somewhere in the sector $S_{i+1}$ due to an external shock (②), and that the laser beam has accessed a track 21 (③).

When the laser beam jumps from the sector $S_{i+1}$ on the track 20 to the sector $S_k$ on the track 21 during the recording, data will be recorded across an area lying between the two tracks 20 and 21 (② to ③), the power of the laser beam is immediately switched to the reproduction level by the detection of the track jump, so that the data previously written in that area is not destroyed.

The address of the following sector $S_{k+1}$ of the track 21 is regenerated (④), thereby an actual position of the laser beam is obtained and based on the actual position, return to the original track 20 is performed. That is, a track 22 is searched based on an address difference between the original track and the current track (⑤, ⑥), and the sector $S_{i+1}$ of the track 20 is accessed after a rotational delay (⑦). Thus when the sector $S_{i+1}$ is detected, data recording is re-started. (⑧) from the beginning of this sector. Then, data is consecutively recorded into the following sectors $S_{i+2}$, $S_{i+3}$, ... Accordingly, data recording is carried out at divisional two times, recording periods A and B. Even in the interval between the recording periods A and B, data to be recorded is continuously input and temporarily stored at the dual port memory 11. Thereby, continuous data is recorded in the consecutive sections even if a track jump occurs.

Figure 4:
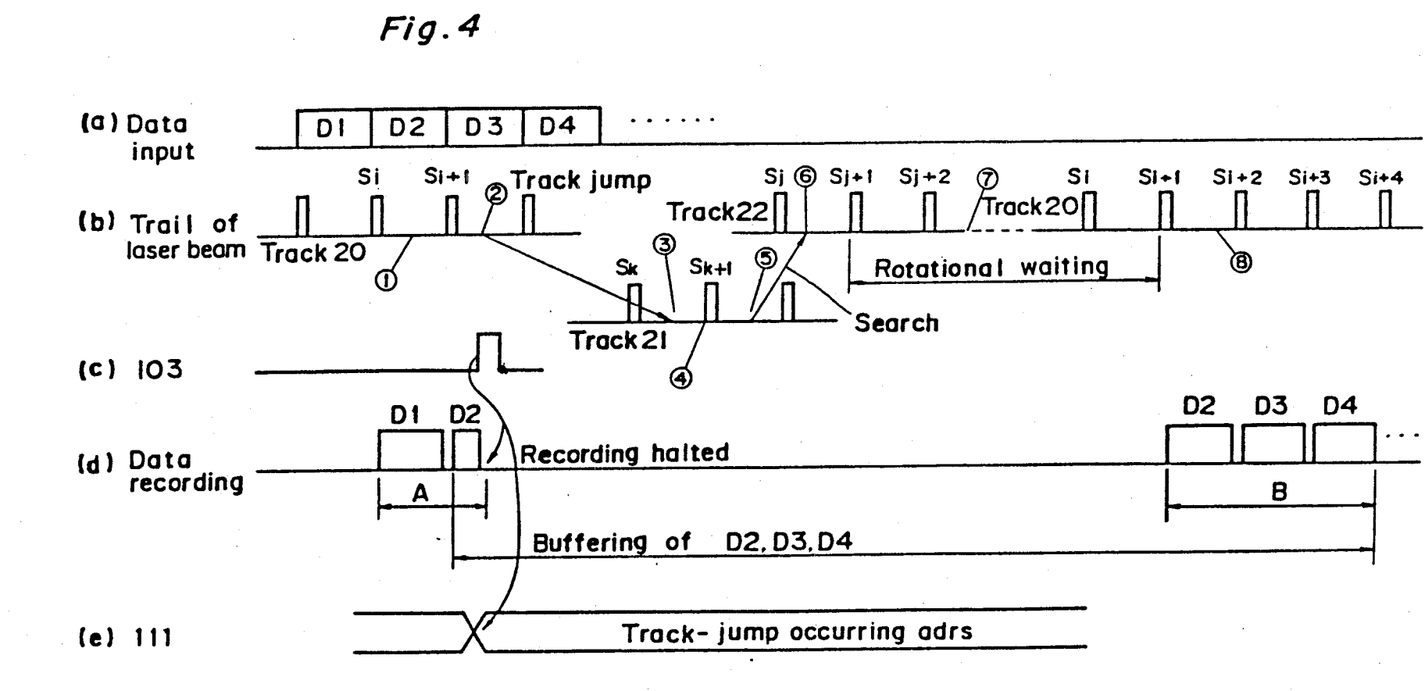

FIG. 4 is a signal timing chart for the data recording operation in FIG. 3. In FIG. 4, (a) illustrates input (receipt) timing of data D1, D2, D3, D4, transferred from the host system; (b) illustrates a trail of the laser beam of the optical head 3 on the optical disk 1; (c) illustrates track-jump signal 103; (d) illustrates the timing for the data recording operation; and (e) illustrates the track-jump occurring address 111.

Now assume that the input data D1 is recorded starting with the sector $S_i$ of the track 20 (①), and that a track jump to the track 21 has occurred while the data D2 is being recorded to the sector $S_{i+1}$ (②, ③). When the track-jump signal 103 is detected from the tracking error signal 102, the recording of the data D2 is immediately halted by the recording halt signal 104, as shown in FIG. 4 (d), the laser power being switched to the reproduction level. At the same time, the address at which the track jump has occurred is stored in the track-jump occurring address latch 19, as shown in FIG. 4 (e).

By knowing the current position of the laser beam from the address of the sector $S_{k+1}$ of the track 21 (④), the track-jump occurring track 20 is searched (⑤, ⑥). That is, after the track 22 is searched, a rotation waiting is performed and the sector $S_{i+1}$ of the track 20 is accessed (⑦) Thus when the sector $S_{i+1}$ is detected, the recording of the data D2 is performed again from the beginning of the sector $S_{i+1}$, and then the data D3, D4 which have been input and buffered at the memory 11 (see FIG. 4(d)) during the aforementioned track-jump restoration processing are recorded in the sectors $S_{i+2}$, $S_{i+3}$ continuously. The data recording is thus carried out at divisional two times, recording period A (for data D1 and part of data D2) and recording period B (for data D2, D3, and D4).

The information recording/reproducing apparatus of the present invention constructed as above is described in regard to its recording operation with reference to FIGS. 1-4.

(1) The CPU 17 starts the reception of data to be recorded via the interface circuit 12 from the host system. The memory address counter I 14 generates memory addresses at which the input data are stored, and the data written into the RAM 13 at the respective addresses in order of receipt.

(2) The CPU 17 instructs the track search mechanism 7 to search a target track 20 that the optical disk 1 accesses for recording. More specifically, the CPU 17 reads address information from the data modulating-/demodulating and address regenerating circuit 8 to know the current track position, and sets in the track search mechanism 7 the address difference from the target track 20 and the search instruction.

(3) When the optical head 3 accesses the target track 20, the CPU 17 provides the sector read/write control circuit 9 with a write instruction and the recording-target sector address $S_i$.

(4) When the sector $S_i$ is detected, the sector read/write control circuit 9 outputs the write gate signal 106 to the data modulating/demodulating and address regenerating circuit 8, where the data D1 from the RAM 13 is modulated while an error correction code is encoded by the ECC 10. The memory 13 is read while the readout address is updated with the clock 110 by the memory address counter II 15.

(5) As the recording medium of the optical disk 1, a (5) magneto-optical recording material or phase-change rewritable material is used. For example, in the case of the phase-change rewritable material, the data modulating signal 108 allows the laser driving circuit 4 to modulate a current of the laser diode of the optical head 3 at the following three levels: writing power $P_W$, erasing power $P_E$, and reading power $P_R$ (where, $P_W > P_E > P_R$).

The portion to which the writing power $P_W$ has been applied on the recording film is heated to over its melting point, and thereafter rapidly cooled into an amorphous state, thus allowing the signal to be recorded. The portion to which the erasing power $P_E$ has been applied is heated to a temperature over its crystallizing temperature and under its melting point into a crystalline state, that is, it is erased. Thus, the signal is simultaneously erased and recorded to the track 20.

(6) When the recording of the data D1 is terminated, the CPU 17 instructs the recording of the data D2 to the sector $S_{i+1}$, as in the above steps (3) and (4).

(7) Now suppose that an external shock is applied to the system during the recording to the sector $S_{i+1}$, causing the laser beam of the optical head 3 to be displaced out of the track 20 and a track jump to occur, and that the optical head 3 has accessed the track 21.

(8) The track-jump detector circuit 18 outputs the recording halt signal 104 to the laser driving circuit 4 and moreover interrupts the CPU 17 by the track-jump signal 103. Meanwhile, the track-jump occurring track and sector address are latched to the track-jump occurring address latch 19 by the track-jump signal 103.

(9) The laser driving circuit 4 forces the laser output to be switched to the reading power $P_R$ by the recording halt signal 104, thereby preventing the recording to the transverse track during the track jump so that the signal previously recorded will not be destroyed.

(10) The CPU 17 reads the track-jump occurring address latch circuit 19 upon the track-jump interrupt to know the track-jump occurring address 111. Then, the CPU 17 reads the track address of the jump-destination track 21 of the optical head 3 by the data modulating-/demodulating and address regenerating circuit 8, and sets the number of tracks to be traveled in the track search mechanism 7 taking into account the above-noted track-jump occurring address 111 so as to thereby drive the linear motor 2, thus searching the track 22.

(11) When the track 22 is accessed, the CPU 17 sets the initial memory address of the memory address counter II 15 to the leading address of the data D2 and then provides a record instruction and the recording-target sector address $S_{i+1}$ to the sector read/write control circuit 9. After the rotation waiting of the optical disk 1, the CPU 17 makes the optical head 3 access the sector $S_{i+1}$, and thereafter the data D2 is recorded again to the sector $S_{i+1}$ from the beginning, as in the steps (3) and (4).

(12) The data D3, D4, . . . input in succession during the above track-jump recovery processing are buffered at the RAM 13 in the meantime, and recorded again after the track-jump restoration.

More specifically, the CPU 17, after recording again in the track-jump occurring sector $S_{i+1}$, consecutively records the data D3 and D4 into the sectors $S_{i+2}$ and $S_{i+3}$ in the same manner as in the steps (2) to (4).

In the data recording above described, the RAM 13 serves as a so-called dual port RAM that performs data writing and reading simultaneously, whereas the CPU 17 monitors memory address values in the memory address counters I and II 14 and 15, so that any overrun of writing to and reading from the RAM 13 will not occur.

Moreover, the memory 13 is designed to have a capacity large enough not to cause any data loss of the continuous data source, in terms of the track search speed, disk rotation speed, data transfer speed, and track-jump recovery processing time. More specifically, the RAM 13 has a capacity enough to store data equivalent to at least two tracks.

According to the present invention, as described above, even if any track jump occurs during a recording operation, recording of continuous data can be carried out without losing any data.

Next, the present invention is described below with regard to data reading of sector data recorded in the foregoing way.

(1) The CPU 17 instructs the track search mechanism 7 to search the track 20 that is a target for reproduction in the optical disk 1. More specifically, the CPU 17 reads address information from the data modulating-/demodulating and address regenerating circuit 8 to know a current track position, and provides the track search mechanism 7 with the address difference from the target track 20 and a search instruction.

(2) When the optical head 3 accesses the target track 20, the CPU 17 provides a read of a target sector $S_i$ to the sector read/write control circuit 9.

(3) When the sector $S_i$ is detected, the sector read/write control circuit 9 outputs the read gate signal 107 to the data modulating/demodulating and address regenerating circuit 8. The data modulating/demodulating and address regenerating circuit 8 demodulates the reproduction signal 100 output from the head amplifier 5. After errors are corrected by the ECC 10, the demodulated data is written into the memory 13. The data writing to the RAM 13 is performed while the memory address counter II 15 updates the writing address by the clock 110.

(4) When the reading of the sector S: is terminated, the CPU 17 reads the following sectors $S_{i+1}$, $S_{i+2}$, ... by repeating the above-described steps (2) and (3).

(5) The CPU 17, when readout data is ready at the RAM 13, starts to transfer data to the host system via the interface circuit 12.

The RAM 13 sets the memory address counter I 14 to the leading address of the data D1, and then the data are read with the address being updated in response to a clock 109 indicating that the interface circuit 12 requests data. The data read out is transferred to the host system from the interface circuit 12.

Since the reading power $P_R$ applied during the data reading operation is in general small as compared with the writing power $P_W$, namely less than one tenth of $P_W$, the tracking servo is so stable that a track jump is unlikely to occur. Moreover, even if a track jump occurs during data reading, the track jump itself will not be so critical as to destroy data of other tracks. Such a track jump is in many cases recovered by reading it once more.

However, the track jump causes data readout to be intermittent, and therefore is a problem in an application in which time-based continuity is highly required. A solution to this problem is to provide the RAM 13 with a capacity large enough to afford a continuous output during a time period of the track-jump recovery processing. That is, to ensure the continuity of the data output from the interface circuit 12, data read out from the optical disk in an amount equivalent to at least the track-jump restoration processing time are temporarily stored in the RAM 13, and thereafter output to the host system through the interface circuit 12. In this case, it is necessary to read out data at a sufficiently high speed in order to reduce a response time from issue of a read instruction to an actual output of data to the host system.

Although the MCAV format in which an ID portion of each sector indicates the entirety of the sector is used as a format for the optical disk 1 in this embodiment, other formats such as, for example, a format in which the ID portions are formed by track-wobbling or a CAV (Constant Angular Velocity) format, are also available.

Furthermore, although the recording and reproducing apparatus of the above embodiment uses an optical disk as a recording medium, the present invention can be applied to other types of recording devices such as one which uses a magnetic disk as a recording medium and has a floating magnetic head.

As described above, according to the present invention, even if any track jump occurs, data having a time-based continuity attribute can be recorded without causing any data loss, to a great practical effect.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information recording/reproducing apparatus for writing on and reading from a rewritable optical disk having tracks divided into a plurality of sectors, said sectors each being a unit of data writing and reading, comprising:

an optical head for following a target track while emitting a laser beam such that said laser beam focuses on said target track, thereby writing on and reading from said optical disk;

a track search means for searching said target track and for moving said optical head to said target track;

a recording and reproducing means for actuating said optical head such that said optical head writes on and reads form said optical disk, said recording and reproducing means including a servo circuit for outputting a tracking error signal;

a track address reading means for reading out an address of a sector on a track being followed by said optical head and for outputting a regenerative address signal indicative of said address of said sector;

a track-jump detection means for, upon receipt of said tracking error signal from said recording and reproducing means, comparing said tracking error signal with a predetermined threshold and for outputting a track-jump detection signal and a recording halt signal based on a comparison result, said track-jump detection signal being indicative of an occurrence of a track jump while said optical head is writing data on said optical disk;

a track-jump address storage means for, in response to said track-jump detection signal from said track-jump detecting means, storing said regenerative address signal from said track address reading means and for outputting an address of a track-jump occurring sector wherein said track jump has occurred;

a recording halt means for, upon receipt of said recording halt signal from said track-jump detection means, halting said recording and reproducing means so as to halt data writing by said optical head;

a buffer means for temporarily storing data to be written on said optical disk after said truck-jump has occurred;

a first address generation means for generating addresses of said buffer means to which data to be written on said optical disk are written;

a second address generation means for generating addresses of said buffer means which are accessed so that data is read therefrom; and a control means for, upon receipt of said track-jump detector signal from said track-jump detection means, controlling said second address generation means to generate an address of said buffer means based on said address of said track-jump occurring sector outputted from said track-jump address storage means, thereby allowing said recording and reproducing means to actuate said optical head to write data stored at the address of said buffer means generated by the second address generation means on said track-jump occurring sector and the following consecutive sectors.

2. The information recording/reproducing apparatus as claimed in claim 1, wherein said control means controls said second address generation means such that when a track jump occurs, said second address generation means generates addresses at which said buffer means stores data which should have been written on said track-jump occurring sector from its leading position.

3. The information recording/reproducing apparatus as claimed in claim 1, wherein said buffer means has a capacity enough to store at least data equivalent to two tracks.

4. An information reproducing apparatus for reading from a rewritable optical disk having tracks divided into a plurality of sectors, said sectors each being a unit of data writing and reading comprising:

an optical head for following a target track while emitting a laser beam such that said laser beam focuses on said target track, thereby reading from said optical disk;

a track search means for searching said target track and for moving said optical head to said target track;

a reproducing means for actuating said optical head to read said optical disk, said reproducing means including a servo circuit for outputting a tracking error signal;

a track address reading means for reading out an address of a sector on a track being followed by said optical head and for outputting a regenerative address signal indicative of said address of said sector;

a track-jump detection means for, upon receipt of said tracking error signal from said recording and reproducing means, comparing said tracking error signal with a predetermined threshold and for outputting a track-jump detection signal and a recording halt signal based on a comparison result, said track-jump detection signal being indicative of an occurrence of a track jump while said optical head is reading data on said optical disk;

a track-jump address storage means for, in response to said track-jump detection signal from said track-jump detecting means, storing said regenerative address signal from said track address reading means and for outputting an address of a track-jump occurring sector wherein said track jump has occurred;

a buffer means for temporarily storing data read from said optical disk by said optical head;

a first address generation means for generating addresses of said buffer means to which the data read from said optical disk are written;

a second address generation means for generating addresses of said buffer means which are accessed so that data is read therefrom; and a control means for, upon receipt of said track-jump detector signal from said track-jump detection means, controlling said track search means to search the track whose address is stored in said track-jump address storage means so that said reproducing means actuates said optical head to read data from said track-jump occurring sector and the following consecutive sectors and also for controlling said second address generation means to generate an address of said buffer means based on said address of said track-jump occurring sector outputted from said track-jump address storage means.

5. The information reproducing apparatus as claimed in claim 4, wherein said control means controls said second address generation means such that when a track jump occurs, said second address generation means generates addresses at which said buffer means stores data which should have been read from said track-jump occurring sector from its leading position.

6. The information reproducing apparatus as claimed in claim 4, wherein said buffer means has a capacity enough to store at least data equivalent to two tracks.

* * * * *

UNITED STATES PATENT AND TRADEMARK OFFICE
CERTIFICATE OF CORRECTION

PATENT NO. : 5,214,626
DATED : May 25, 1993
INVENTOR(S) : Isao Satoh, et. al.

It is certified that error appears in the above-indentified patent and that said Letters Patent is hereby corrected as shown below:

On the Title page, item [75], inventor, change "Isac" to --Isao--.

Signed and Sealed this

Fifteenth Day of March, 1994

*Attest:*

BRUCE LEHMAN

*Attesting Officer*     *Commissioner of Patents and Trademarks*